US010333722B2

(12) United States Patent
Pepe et al.

(10) Patent No.: US 10,333,722 B2
(45) Date of Patent: Jun. 25, 2019

(54) NETWORK SYSTEM FOR CONFIGURABLE DELIVERY OF COMBINED POWER AND DATA SIGNALS OVER TWISTED PAIR WIRING

(71) Applicant: CommScope Technologies LLC, Hickory, NC (US)

(72) Inventors: Paul John Pepe, Clemmons, NC (US); Steven Richard Bopp, Jamestown, NC (US)

(73) Assignee: CommScope Technologies LLC, Hickory, NC (US)

( * ) Notice: Subject to any disclaimer, the term of this patent is extended or adjusted under 35 U.S.C. 154(b) by 312 days.

(21) Appl. No.: 14/186,873

(22) Filed: Feb. 21, 2014

(65) Prior Publication Data

US 2014/0293994 A1 Oct. 2, 2014

Related U.S. Application Data

(60) Provisional application No. 61/768,230, filed on Feb. 22, 2013, provisional application No. 61/768,243, (Continued)

(51) Int. Cl.
*H04L 12/66* (2006.01)
*H04L 12/10* (2006.01)
(Continued)

(52) U.S. Cl.
CPC ............ *H04L 12/10* (2013.01); *G02B 6/4284* (2013.01); *H01B 11/08* (2013.01); *H01B 11/22* (2013.01);
(Continued)

(58) Field of Classification Search
None
See application file for complete search history.

(56) References Cited

U.S. PATENT DOCUMENTS 7,740,498 B1 6/2010 Orsley
2002/0071644 A1* 6/2002 Nakajima ............... H01B 11/22
385/101
(Continued)

FOREIGN PATENT DOCUMENTS

JP 2005-259385 9/2005

OTHER PUBLICATIONS

Lantronix, XPort-AR Power over Ethernet, Revision A, May 2005, All.*

(Continued)

*Primary Examiner* — Melvin Marcelo
*Assistant Examiner* — Angel Brockman
(74) *Attorney, Agent, or Firm* — Merchant & Gould P.C.

(57) ABSTRACT

A telecommunications panel and associated system are disclosed. In one example, the panel includes a panel housing having a first side and a second side, one or more data connectors on the first side, and a power input signal connector on the first side. The panel includes one or more combined power output and data signal connectors on the second side, each of the combined power output and data signal connectors configured to electrically connect to a twisted pair cable and including a plurality of twisted pairs each having first and second wire contacts. The one or more twisted pairs are configured to carry a power signal as a direct current voltage difference between the first and second wire contacts, and the remaining twisted pairs from the plurality of twisted pairs are configured to carry differential data signals. The telecommunications panel is configured to selectably allow pairs of the remaining twisted pairs from the plurality of twisted pairs to cooperate to carry a power signal.

21 Claims, 10 Drawing Sheets

Related U.S. Application Data filed on Feb. 22, 2013, provisional application No. 61/768,255, filed on Feb. 22, 2013, provisional application No. 61/768,261, filed on Feb. 22, 2013.

(51) Int. Cl.
 G02B 6/42 (2006.01)
 H01B 11/08 (2006.01)
 H01B 11/22 (2006.01)
 H01R 24/66 (2011.01)
 H02B 1/46 (2006.01)
 H04L 12/40 (2006.01)
 H04W 52/38 (2009.01)

(52) U.S. Cl.
 CPC ............... *H01R 24/66* (2013.01); *H02B 1/46* (2013.01); *H04L 12/40045* (2013.01); *H04W 52/383* (2013.01)

(56) References Cited

U.S. PATENT DOCUMENTS

| | | | | |
|---|---|---|---|---|
| 2003/0095395 A1* | 5/2003 | Clark | ................ | H01R 13/6658 |
| | | | | 361/796 |
| 2005/0097369 A1* | 5/2005 | Bowser | ................... | H04L 12/10 |
| | | | | 713/300 |
| 2007/0263707 A1* | 11/2007 | Theodoras, II | ....... | H04L 5/1423 |
| | | | | 375/220 |
| 2008/0186667 A1* | 8/2008 | Verdiell | ............... | H05K 7/1492 |
| | | | | 361/679.4 |
| 2008/0253356 A1* | 10/2008 | Berman | ................... | H04L 12/66 |
| | | | | 370/352 |
| 2010/0005320 A1* | 1/2010 | Squillante | ............... | H04L 12/10 |
| | | | | 713/300 |
| 2011/0043333 A1 | 2/2011 | German | | |
| 2012/0002666 A1* | 1/2012 | Miller, III | ......... | H04L 12/40032 |
| | | | | 370/352 |
| 2012/0122348 A1 | 5/2012 | Cho et al. | | |
| 2012/0188865 A1 | 7/2012 | Michaelis et al. | | |
| 2014/0016034 A1* | 1/2014 | Cirstea | ................... | H04N 7/108 |
| | | | | 348/460 |
| 2014/0187985 A1* | 7/2014 | Corl | .................... | A61B 5/02156 |
| | | | | 600/486 |

OTHER PUBLICATIONS

International Search Report and Written Opinion for PCT/US2014/017764 dated Jun. 16, 2014.

\* cited by examiner

NETWORK SYSTEM FOR CONFIGURABLE DELIVERY OF COMBINED POWER AND DATA SIGNALS OVER TWISTED PAIR WIRING

CROSS-REFERENCE TO RELATED APPLICATIONS

The present application claims priority from U.S. Provisional Patent Application No. 61/768,230, entitled "Network System for Configurable Delivery of Combined Power and Data Signals Over Twisted Pair Wiring" (NT-00391), U.S. Provisional Patent Application No. 61/768,243, entitled "Cable Construction for Configurable Delivery of Combined Power and Data Signals Over Twisted Pair Wiring" (NT-00392, U.S. Provisional Patent Application No. 61/768,255, entitled "Interface for Configurable Delivery of Combined Power and Data Signals Over Twisted Pair Wiring" (NT-00393), and U.S. Provisional Patent Application No. 61/768,261, entitled "Methods Providing Configurable Delivery of Combined Power and Data Signals Over Twisted Pair Wiring" (NT-00394), each of which were filed on Feb. 22, 2013, and each of which is hereby incorporated by reference in its entirety.

TECHNICAL FIELD

The present application relates generally to telecommunications equipment, and in particular equipment configured to manage Power-over-Ethernet twisted pair communications. Specifically, the present application relates to a network system and associated equipment for configurable delivery of combined power and data signals over twisted pair wiring.

BACKGROUND

Twisted pair communications networks are commonly used to communicate data within a building, or across large distances. In such networks, data is transmitted in the form of a differential signal traveling along a plurality of twisted pair wires within a cable. Current standards for such communication are defined in standards established by the Institute of Electrical and Electronics Engineers (IEEE). Those standards set requirements for frequency and signal amplitude for those differential signals, and are described in IEEE 802.3 standards documentation.

In more recent times, efforts have been made to also transmit power over the cables that contain the twisted pair wires. For example, there are a number of IEEE standards documents within the IEEE 802.3 family that define standards for delivery of power over existing Category-5 ("Cat-5") or better twisted pair cables. In one configuration defined in the standards, in a Cat-5 or higher cable, a first wire pair will carry differential signals (data) and operate at a first steady state DC voltage, while a second wire pair will carry other differential signals (data) at a second DC voltage. The difference between the DC voltages of the first and second wire pairs provides a DC power source to the far end equipment connected to the Cat-5 cable. In particular, IEEE 802.3af, 802.3at, and 802.3at 4-pair each provide definitions of analogous ways in which a direct current voltage can be delivered on the same wires of a four-pair cable. Equipment supporting this service is referred to as power-over-ethernet, or PoE, equipment, and is compatible with 10Base-T and greater systems, up to systems providing 1 Gigabit data rates. Above that data rate, existing PoE standards do not allow for delivery of power due to interference issues relating to the data passed using higher-frequency differential signals required for communication at those higher rates for S/UTP and U/UTP systems, in which cables generally lack shielding between different differential pairs.

In the existing PoE standards, power and data are integrated on a single cable infrastructure in a way that allows for delivery of power to remote network endpoints, without requiring those endpoints to have a separate AC outlet installation. This provides cost savings, as well as improved safety and network reliability without increasing the complexity of deploying such networks since no additional cabling for power distribution is required. However, existing PoE systems are not without drawbacks. In particular, existing systems that conform to or are compatible with the IEEE standards have limits in terms of the amount of power available to be delivered to the far-end system. In particular, existing PoE systems typically have a 300 milliamp limit, leading to a 17.1 watt maximum power delivery limit per pair at a socket. Practically, PoE systems deliver about 15.4 watts, and under 13 watts are typically assumed to be received due to power dissipation along the line.

Although improved PoE systems (e.g. as defined in IEEE 802.3at-2009), referred to as PoE+, can provide up to 25.5 watts of power, these systems still are generally insufficient to power many types of networking equipment at a far end location, without requiring supplemental power from an AC power outlet. Furthermore, as data speeds increase and cabling requirements move beyond Cat-5 (to Cat-6, Cat 6A, and Cat-7, and beyond, supporting gigabit and 10 G data rates), and corresponding 802.3 standards changes to accommodate higher data rates, there are cases where concurrent power and data are not supported. For example PoE is unsupported for 10 Gigabit applications. As such, existing solutions are limited in terms of both power delivery and capability to continue delivering power as data rates increase.

For these and other reasons, improvements are desirable.

SUMMARY

In accordance with the following disclosure, the above and other issues are addressed by the following:

In a first aspect, a telecommunications panel is disclosed. The panel includes a panel housing having a first side and a second side, one or more data connectors on the first side, and a power input signal connector on the first side. The panel includes one or more combined power output and data signal connectors on the second side, each of the combined power output and data signal connectors configured to electrically connect to a twisted pair cable and including a plurality of twisted pairs each having first and second wire contacts. The one or more twisted pairs are configured to carry a power signal as a direct current voltage difference between the first and second wire contacts, and the remaining twisted pairs from the plurality of twisted pairs are configured to carry differential data signals. The telecommunications panel is configured to selectably allow pairs of the remaining twisted pairs from the plurality of twisted pairs to cooperate to carry a power signal.

In a second aspect, a telecommunications panel includes a panel housing having a first side and a second side, and a combined power input and data signal connector on the first side. The panel further includes a plurality of combined power output and data signal connectors on the second side, each of the plurality of combined power output and data signal connectors electrically connected to power and data signals from the combined power input and data signal connector and configured to electrically connect to a twisted pair cable and including electrical contact springs positioned for connection to at least first, second, third, and fourth twisted pairs each having first and second wire contacts. The first, second, third, and fourth twisted pairs are each configured to carry a differential data signal, and the telecommunications panel is configured to selectably allow the second and third twisted pairs to cooperate to carry a power signal. The telecommunications panel is also configured to selectably allow the first and fourth twisted pairs to cooperate to carry a power signal.

In a third aspect, a telecommunications system includes a first telecommunications panel that has one or more data connectors, a power input signal connector, and one or more combined power output and data signal connectors. Each of the combined power output and data signal connectors is configured to electrically connect to a twisted pair cable, and includes a plurality of twisted pairs each having first and second wire contacts, wherein one or more of the twisted pairs configured to carry a power signal as a direct current voltage difference between the first and second wire contacts and the remaining twisted pairs from the plurality of twisted pairs are configured to carry differential data signals The telecommunications panel is configured to selectably allow pairs of the remaining twisted pairs from the plurality of twisted pairs to cooperate to carry a power signal. The system further includes a second telecommunications panel including a combined power input and data signal connector communicatively connected to a cable leading from one of the one or more combined power output and data signal connectors of the first telecommunications panel. The second telecommunications panel further includes a plurality of combined power output and data signal connections, each configured to electrically connect to a twisted pair cable and including electrical contact springs positioned for connection to at least first, second, third, and fourth, twisted pairs each having first and second wire contacts.

In a fourth aspect, a networked system includes a first telecommunications device configured to receive power signals and data signals and transmit combined power and data signals over one or more twisted pair cables, each of the twisted pair cables including a plurality of data channels. The networked system further includes a second telecommunications device remote from the first telecommunications device, the second telecommunications device configured to electrically connect to one or more of the first twisted pair cables, the second telecommunications device including a plurality of single channel combined power and data twisted pair connectors.

In a further aspect, a twisted pair cable includes a first twisted pair including first and second wires each including a conductor and an outer insulator, and an inner jacket surrounding the first twisted pair. The twisted pair cable further includes a plurality of twisted pairs each comprising first and second wires each including a conductor and an outer insulator, the plurality of twisted pairs externally adjacent to the inner jacket. The twisted pair cable also includes an outer jacket surrounding the plurality of twisted pairs and the inner jacket.

In a further aspect, a twisted pair cable includes four inner twisted pair cables, with each inner twisted pair cable including a first twisted pair comprising first and second wires each including a conductor and an outer insulator, an inner jacket surrounding the first twisted pair, a plurality of twisted pairs each comprising first and second wires each including a conductor and an outer insulator, the plurality of twisted pairs external to the inner jacket, and an outer jacket surrounding the plurality of twisted pairs and the inner jacket.

In a further aspect, a twisted pair cable assembly includes a plurality of inner twisted pair cables. Each inner twisted pair cable includes a first twisted pair comprising first and second wires each including a conductor and an outer insulator, the first twisted pair configured to carry a power signal as a direct current voltage differential across the first and second wires, an inner shield surrounding the first twisted pair and a second, third, fourth, and fifth twisted pair each comprising first and second wires each including a conductor and an outer insulator. The second, third, fourth, and fifth twisted pairs are externally adjacent to the inner shield, and configured to carry data as a differential signal. The second and third twisted pairs are configured to cooperate to carry power as a direct current voltage differential, and the fourth and fifth twisted pairs are configured to cooperate to carry power as a direct current voltage differential. The assembly includes an outer shield surrounding the second, third, fourth, and fifth twisted pairs and the inner shield. Each of the inner twisted pair cables corresponds to an RJ-50-compatible cable.

In a further aspect, a wired telecommunications interface is disclosed that includes a housing and first, second, third, fourth, fifth, sixth, seventh, eighth, ninth, and tenth consecutively arranged electrical contacts held in an array by the housing and positioned to electrically contact a complementary interface. The second and the third electrical contacts are associated with a first wire pair, and the fourth and the seventh electrical contacts are associated with a second wire pair. The fifth and the sixth electrical contacts are associated with a third wire pair, and the eighth and the ninth electrical contacts are associated with a fourth wire pair. The first, second, third, and fourth wire pairs are configured to carry data as a differential signal.

In a further aspect, a telecommunications jack includes a housing defining a port for receiving a plug, and first, second, third, fourth, fifth, sixth, seventh, eighth, ninth, and tenth consecutively arranged contact springs adapted to make electrical contact with the plug when the plug is inserted into the port of the housing. The jack further includes first, second, third, fourth, fifth, sixth, seventh, eighth, ninth, and tenth consecutively arranged wire termination contacts for terminating wires to the jack, each termination contact electrically connected to the corresponding contact spring. In the telecommunications jack, the second and the third wire termination contacts form a pair for transmitting and receiving data over a twisted wire pair, and the fourth and the seventh wire termination contacts form a pair for transmitting and receiving data over a twisted wire pair. Additionally, the fifth and the sixth wire termination contacts form a pair for transmitting and receiving data over a twisted wire pair, and wherein the eighth and the ninth wire termination contacts form a pair for transmitting and receiving data over a twisted wire pair.

In a further aspect, a telecommunications jack includes a housing defining a port for receiving an RJ-50 plug, and first, second, third, fourth, fifth, sixth, seventh, eighth, ninth, and tenth consecutively arranged contact springs adapted to make electrical contact with the plug when the plug is inserted into the port of the housing. The jack includes first, second, third, fourth, fifth, sixth, seventh, eighth, ninth, and tenth consecutively arranged wire termination contacts for terminating wires to the jack, each termination contact electrically connected to the corresponding contact spring and associated with one of a plurality of differential pairs, the first and tenth wire termination contacts associated with a first differential pair, the second and third wire termination contacts associated with a second differential pair, the fourth and seventh wire termination contacts associated with a third differential pair, the fifth and sixth wire termination contacts associated with a fourth differential pair, and the eighth and ninth wire termination contacts associated with a fifth differential pair. At least two wire pairs are configured to selectably cooperate to carry a power signal as a direct current voltage differential between the pairs of wires.

In a further aspect, a method of delivering power and data over a twisted pair cable is disclosed that includes transmitting a power signal as a direct current voltage differential across the first and second wire in a first twisted pair of a cable, and transmitting data as differential signal across a first and second wire in at least a second, third, fourth, and fifth twisted pair of a cable. The method further includes transmitting a power signal as a direct current voltage differential across two of second, third, fourth, and fifth twisted pairs.

In a further aspect, a method of delivering power and data from a telecommunications panel is disclosed. The method includes transmitting a combined power output signal and data signals at a twisted pair connector of a telecommunications panel, the power output signal provided as a direct current voltage difference across connections associated with a first wire pair electrically connected to the twisted pair connector and the data signals provided as differential signals at connections associated with a plurality of wire pairs also electrically connected to the twisted pair connector. The method also includes switching, at the telecommunications panel, from a first mode to a second mode to deliver power as a voltage difference across two of the plurality of wire pairs.

In a further aspect, a method of delivering power and data in a telecommunications system is disclosed. The method includes receiving a power signal at a power connector of a first telecommunications panel, and receiving a data signal at a data connector of the first telecommunications panel. The method further includes transmitting a combined power output and data signal from a multichannel twisted pair connector of the first telecommunications panel, the combined power output and data signal based on the received power signal and data signal. The method also includes receiving the combined power output and data signal at a multichannel twisted pair connector of a second telecommunications panel, and distributing the combined power output and data signal to a plurality of single channel twisted pair connectors. The method further includes receiving at a telecommunications device, the combined power output and data signal, thereby powering the device and communicating data to the telecommunications device.

DETAILED DESCRIPTION

Figure 1:
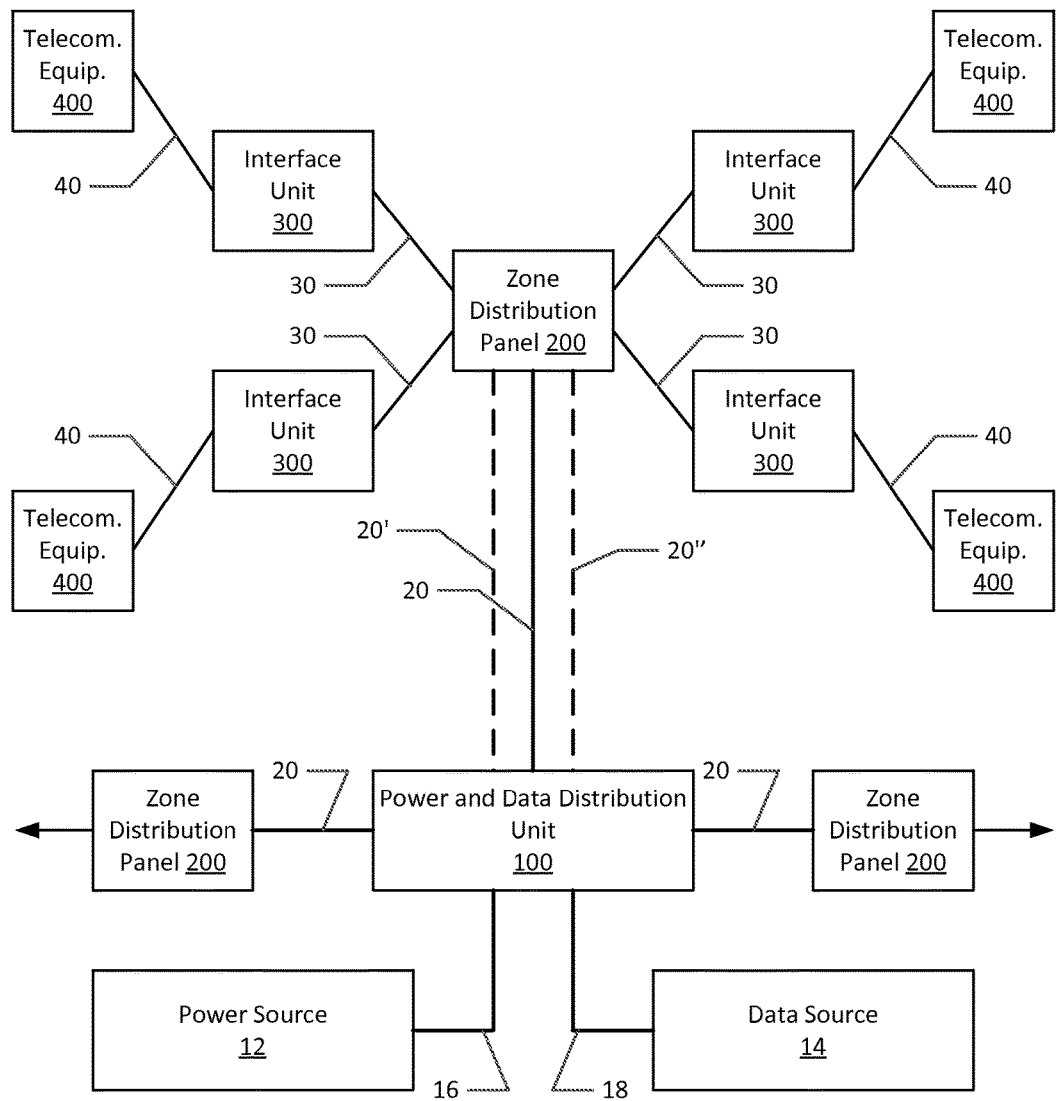
FIG. 1 is a schematic view of a network architecture for configurable delivery of combined power and data signals over twisted pair wiring, according to an example embodiment.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general the present disclosure relates to a network architecture and associated equipment for configurable delivery of combined power and data signals over twisted pair wiring. The disclosure therefore provides different methods and systems for delivery of power and data signals that are useable in networks having different data connection speeds, and therefore provide power to far-end equipment in many scenarios where power delivery, at least of the amount required, would not be possible.

Referring to FIG. 1, a schematic illustration of an example network architecture 10 for configurable delivery of combined power and data signals over twisted pair wiring is shown. The network architecture 10 generally is used to deliver combined power and data signals to a remote system, such as telecommunications equipment that traditionally requires a separate AC connection (e.g., an ultrabook computing system, IP-based phone system, or low-power laptop).

In the embodiment shown, the network architecture 10 includes a power source 12 and a data source 14, which can be located, for example, in an equipment room at a particular facility. The power source can be, for example an alternating current or direct current power source, such as a wall outlet, a power distribution panel, a UPS device, or other analogous power-delivery equipment system. The data source 14 can be, for example, any type of data source such as optical or electrical data communication equipment, or a connection to remote optical or electrical data communication equipment.

In the embodiment shown, the power source 12 and data source 14 are connected to a Power over Ethernet distribution panel 100. The PoE distribution panel 100 receives a power supply from the power source 12 via a power cable connection 16, as well as data from the data source 14 via a data connection 18. The power cable connection 16 can be, for example, a copper wired connection, while the data connection 18 can be any of a variety of types of connections, such as a twisted pair, coaxial, RF, fiber optic, or other type of data signal communication system compatible with the data source 14.

In general, the PoE distribution panel 100 receives data and power signals in a variety of formats, and converts that data and power into an electrical, twisted pair differential signaling format in which power and data are combined for transmission using a single cable. The PoE distribution panel 100 therefore provides a mechanism by which a substantial amount of power can be routed within a network without requiring that both power and data connections be routed to each location in the network, or otherwise requiring that a separate power connection be available at every location in the network. Details regarding an example implementation of a PoE distribution panel 100 are provided below, in conjunction with FIGS. 2-4.

Figure 8:
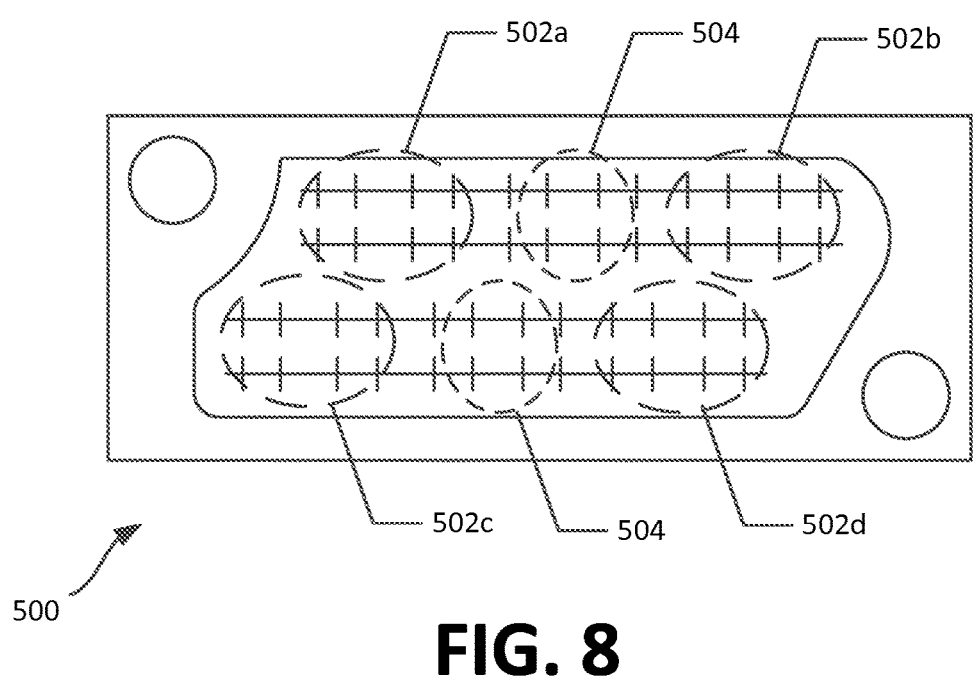
FIG. 8 illustrates a schematic pinout of an MRJ21 connector useable to implement aspects of the present disclosure.
Figure 12:
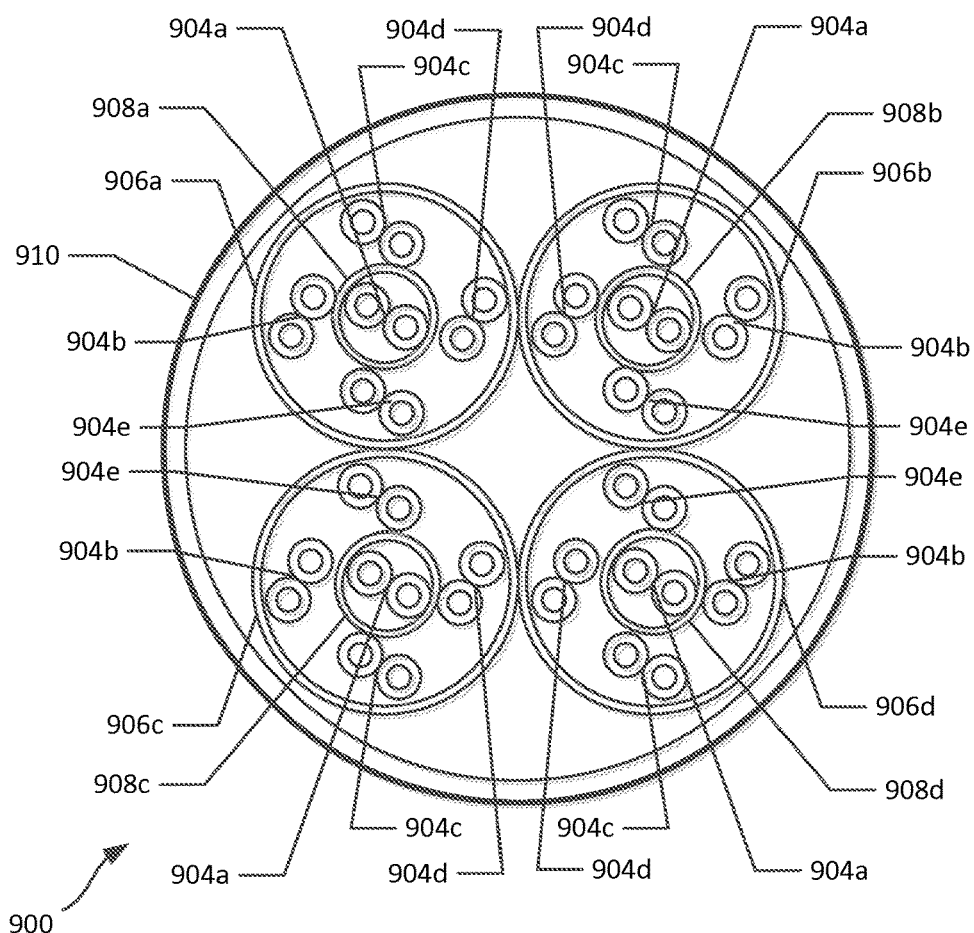
FIG. 12 illustrates an example cable construction for a trunk cable useable to connect between a Power over Ethernet distribution panel and a zone data and power distribution panel.

In the embodiment shown, the PoE distribution panel 100 is communicatively connected to one or more zone distribution panels 200 via a trunk cable 20. In some embodiments, the trunk cable 20 includes multiple data channels, and aggregates power and data signals onto a single cable. For example, in some embodiments, the trunk cable 20 can include up to four separate channels of combined power and data signals. In such embodiments, each channel can include a plurality of twisted pair connections useable in that channel, including twisted pairs dedicated to power delivery as well as pairs selectably used for power and/or data delivery. In a particular embodiment, the trunk cable 20 can be configured to carry up to 48 separate twisted pair wires. In such embodiments, the trunk cable can use an MRJ21 connector format, such as is available from Tyco Electronics Corp. of Berwyn, Pa. An MRJ21 connector generally includes 24 pairs of connections (48 total wires) and is useable for high density connections in a twisted pair system. One example pin assignment for an MRJ21 connector capable of supporting a combined power and data connection is illustrated in FIG. 8, and discussed in further detail below. Additionally, an example of a construction of a trunk cable useable in connection with the present disclosure is illustrated in FIG. 12, discussed below.

In some embodiments, each zone distribution panel 200 can be connected to the PoE distribution panel 100 via a plurality of trunk cables. In the embodiment shown, one of the zone distribution panels 200 is connected to the PoE distribution panel 100 via three trunk cables 20, 20', and 20" respectively. In such embodiments and arrangements, the PoE distribution panel 100 can deliver additional power and data to each of the zone distribution panels 200, with each cable 20, 20', and 20" including multiple channels of combined power and data.

The zone distribution panels 200 can be located remotely from the PoE distribution panel 100, for example distributed throughout premises at which the PoE distribution panel is located. In example embodiments, the zone distribution panels 200 can be ceiling, floor, or wall-mounted arrangements located at various places within a premises, for example at every floor or every other floor of a building, depending on the size and configuration of the building and connection requirements of that building.

The zone distribution panels 200 each receive combined, multi-channel power and data signals and redistribute those signals in a way that is useable at endpoints configured to receive such power and data signals. In particular, the zone distribution panels 200 each receive, on each trunk cable 20, a plurality of channels of combined power and data, and distribute that data to separate interface units 300. In the example embodiment shown, each trunk cable 20 is capable of carrying up to four channels of twisted pair connections, and therefore the zone distribution panels 200 are each capable of separating that trunk cable onto four separate channels. Each channel distributed from the zone distribution panel 200 to the interface units 300 is connected by a separate channel 30 of combined power and data signals.

Figure 9:
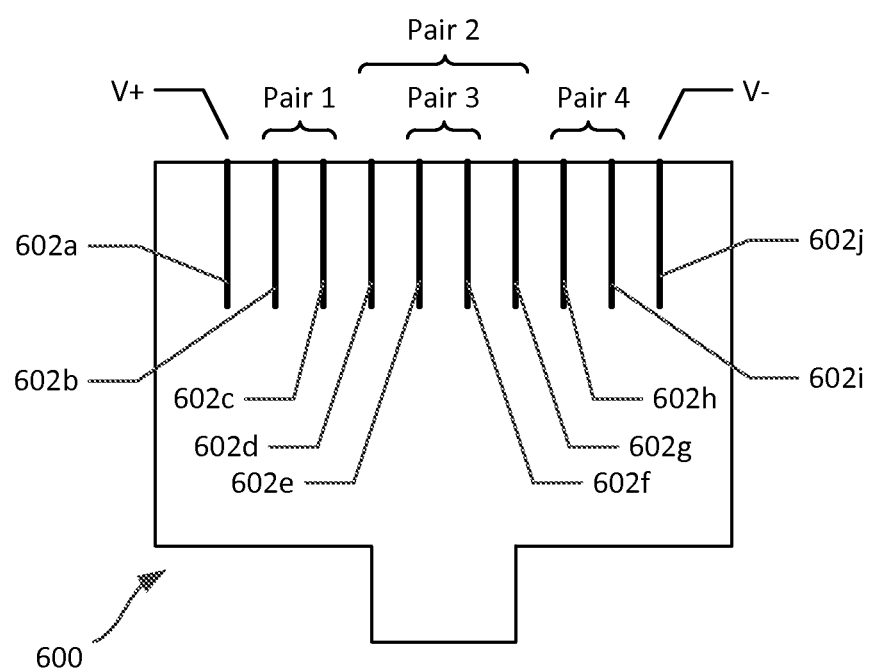
FIG. 9 illustrates a schematic pinout of an RJ-50 connector useable to implement aspects of the present disclosure.

As discussed in further detail below, the power and data signals are configured such that, in some embodiments, each of the channels are capable of communicating at 10 Gigabit/second data rates, or are switchable to provide differing (increased) levels of power delivery as compared to existing PoE standards. In connection with this arrangement, the channel 30 can use additional twisted pair wires as compared to a traditional Category-5, Category-6, or other type of cable. In an example embodiment, the channel 30 is implemented using five twisted pairs, including four pairs used for data (and optionally power), as well as a twisted pair used for DC power distribution. In such embodiments, connectors at the zone distribution panel 200 and interface units 300 can be, for example RJ-based plug and jack connections, such as an RJ-50 connection as illustrated in FIGS. 9-11, and discussed in further detail below.

In the example embodiment illustrated in FIG. 1, the interface units 300 are configured to receive at least one channel of a combined power and data signal, and deliver power and data to a module application item 400. The interface units 300 can be, in various embodiments, a faceplate module, coupler, adapter module, or a jack or interface associated with such an adapter module. In addition, the module application item 400 can be, in various embodiments, a VoIP Phone, a WLAN access point (e.g., an 802.11a/b/g/n wireless access point), a network security device, an access control module, a WiMax connection point, a point-of-sale touch screen, a laptop, or other types of equipment. In some alternative embodiments, the interface units 300 can be integrated with the module application item 400.

In embodiments where the interface units 300 are separate from the module application items 400, each interface unit 300 can be connected to the module application item 400 in a variety of ways. In some embodiments, the interface unit 300 and module application item 400 can be connected using a cable 40, which can optionally have the same type of connection as between the zone distribution panel 200 and the interface unit 300; in alternative embodiments, different types of interfaces could be used. For example, in embodiments in which the zone distribution panel 200 and the interface unit 300 are connected by a 5-pair twisted pair wire and associated RJ-50 connectors, the interface unit 300 can be connected to the module application item 400 by a corresponding 5-pair wire and RJ-50 connection.

In alternative arrangements, a four pair wire and an associated RJ-45 interface could be used. In such arrangements, any required additional power beyond that which is able to be delivered by existing PoE arrangements on Category 5 and 6 wiring and available at the interface unit 300 (e.g., delivered on the fifth pair) could be provided to the module application item 400 on a separate power connection.

It is noted that, in the network arrangement 10 of FIG. 1, it is possible to deliver both power and data over combined power and data signals such that, for some or all of the zone distribution panels 200, interface units 300, and module application items 400, the power supplied to the PoE distribution panel 100 is sufficient to deliver power to each of the other components within the network arrangement 10. Details regarding power delivered via the trunk cables 20 and combined power and data cables 30, are discussed in further detail below.

Figure 2:
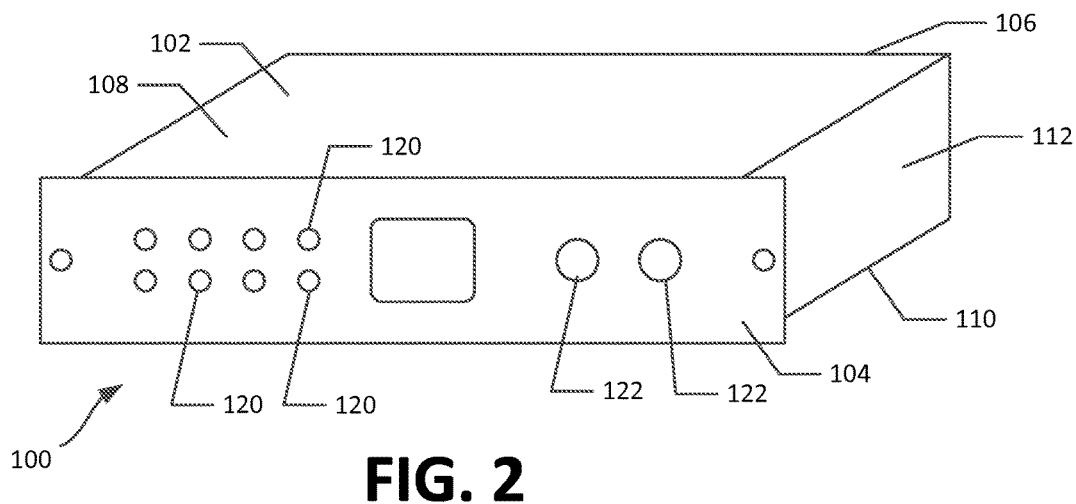
FIG. 2 is a schematic front perspective view of a Power over Ethernet distribution panel, according to an example embodiment of the present disclosure.
Figure 3:
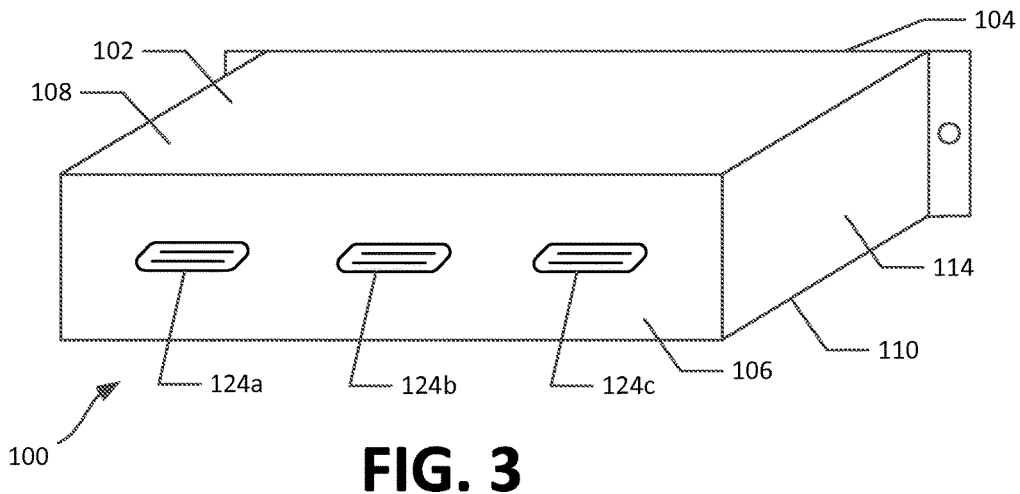
FIG. 3 is a schematic rear perspective view of the Power over Ethernet distribution panel of FIG. 2.
Figure 4:
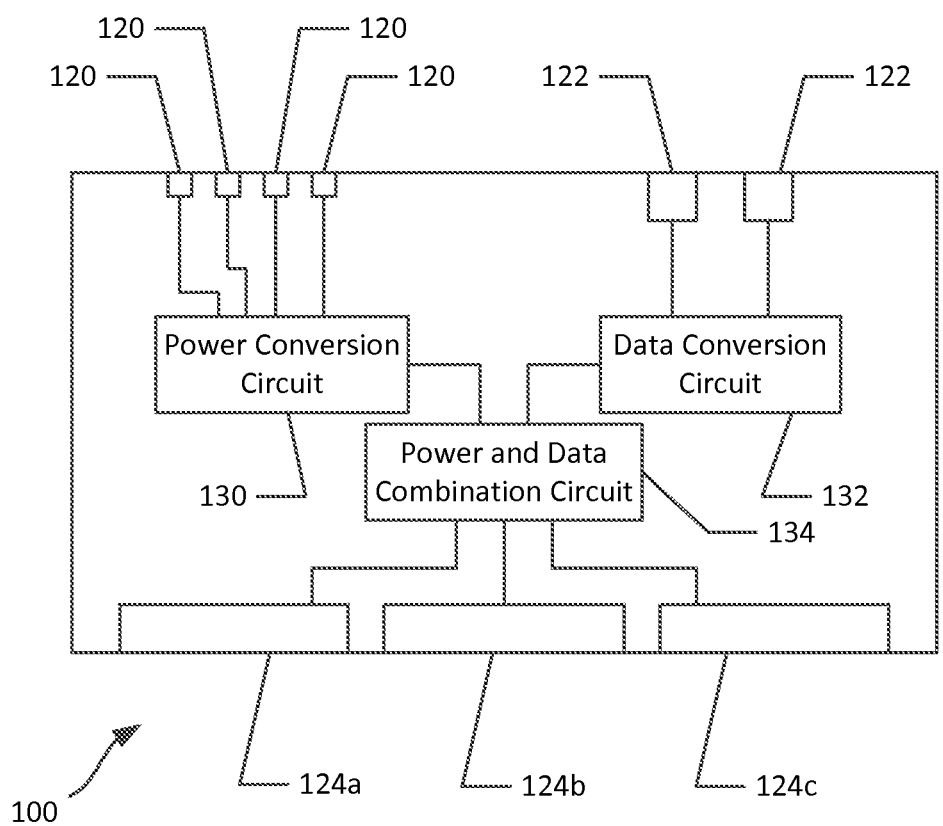
FIG. 4 is a schematic view of interconnections within the Power over Ethernet distribution panel of FIG. 2.

Referring now to FIGS. 2-4, an example schematic illustration of a PoE distribution panel 100 is illustrated. The PoE distribution panel 100 includes an enclosure 102 that has a front side 104 and a back side 106, as well as a top 108, bottom 110, and left and right sides 112, 116, respectively. The PoE distribution panel 100 can be, for example, sized to fit within a telecommunications panel, for example a 1 U, 2 U, or 3 U height format. In alternative embodiments, the PoE distribution panel 100 can be freestanding equipment, and can take any of a variety of forms.

In the embodiment shown, the PoE distribution panel 100 includes one or more power connections 120 and data connections 122 on a first side of the panel, and a plurality of combined power and data connections (shown as connections 124a-c) on a second side of the panel. For example, in the example embodiment shown, the power connection 120 and data connection 122 can be located on the front side 104, and the combined power and data connections 124a-c can be located on a rear side of the panel. In alternative arrangements, other locations for the various connections 120, 122, 124a-c could be used as well.

The one or more power connections 120 can be any of a variety of power connections capable of delivering sufficient power to the PoE distribution panel 100 for delivery to zone distribution panels 200, and onward to the interface units 300 and module application items 400 as illustrated in FIG. 1. In preferred embodiments, the power connections 120 receive direct current power, for example from a direct current power source such as a power panel. As such, the power connections 120 can include positive and negative voltage terminals, or some other arrangement by which the PoE distribution panel 100 can receive power from a remote power source. In alternative embodiments, the PoE distribution panel 100 can receive alternating current voltage, and can convert that voltage to direct current signals to be distributed via the combined power and data connections 124a-c. Furthermore, although in the embodiment shown a plurality of power connections are illustrated, it is recognized that the panel 100 can include from one to many such power connections, and can include different types of power connections in the alternative, in the event that different power types (e.g., AC, DC, etc.) are available.

The data connections 122 can be any of a variety of types of connectors, depending upon the type of data source to which the PoE distribution panel 100 is connected. For example, the data connections 122 can correspond to fiberoptic cable connectors, twisted pair connectors, coaxial connectors, or other types of electrical, optical, or other data connections.

The combined power and data connections 124a-c correspond to twisted pair wiring connectors by which both differential data signals and direct current power (voltage) can be distributed to a remote system. In various embodiments, each of the combined power and data connections 124a-c is a high-density connector configured to deliver multiple channels of power and data to a remote system, such as a zone distribution panel 200. In example embodiments, the combined power and data connections 124a-c can implement the MRJ21 connector format, and use a customized pin assignment as illustrated in FIG. 8, for use with a trunk cable 20 such as the one shown in FIG. 12, below. Although three combined power and data connections 124a-c are illustrated, in various embodiments, additional such connections can be provided. In one example embodiment, the PoE distribution panel 100 includes 1-3 or more combined power and data connections 124 per zone distribution panel 200 to which it can be connected.

As illustrated in FIG. 4, the PoE distribution panel 100 includes internal circuitry configured to merge data signals with power signals, and, if needed, convert between a format of a data signal at the data connections 122 and a twisted pair wiring signal at the combined power and data connections 124a-c. For example, in the embodiment shown, the PoE distribution panel 100 includes a power conversion circuit 130, a twisted pair conversion circuit 132, and a combined power and data circuit 134.

The power conversion circuit 130 provides voltage and current regulation, to ensure that the power delivered to the combined power and data circuit 134 and then to combined power and data connections 124a-c is provided at an appropriate level. For example, existing PoE+ systems can have a voltage difference of approximately 50-57 volts across two wire pairs (with the wires of a pair having the same direct current voltage, and differences in voltage between the wires of the pair representing a differential data signal). Additional details regarding output power from the power conversion circuit 130 for use at the combined power and data connections 124a-c is provided below in connection with description of an example power delivery arrangement using an MRJ21 interface and associated trunk cable.

The data conversion circuit 132 converts between twisted pair communications at the combined power and data connections 124a-c and the specific type of data communications protocol and/or media received at the data connections 122. For example, if the data connections 122 correspond to optical connections, the data conversion circuit 132 can be constructed with optical-to-electrical conversion circuitry, as well as circuitry configured to generate differential data signals on a channel of a twisted pair wire arrangement, and vice versa. In alternative arrangements, RF-to-twisted pair, or other types of conversion circuitry, can be used based on the type of data connection received at the panel 100. Furthermore, in some embodiments, more than one type of data connection 122 can be included in the panel 100; in such embodiments, multiple types of conversion circuitry would typically be included in the data conversion circuit 132.

The combined power and data circuit 134 receives power from the power conversion circuit 130 and twisted pair signals from the twisted pair conversion circuit 132 and combines the power and twisted pair data signals for distribution to the combined power and data connections 124a-c. In various embodiments, the combined power and data circuit 134 provides routing of data embodied in twisted pair signals to various connectors based on the intended destination for that data. In other words, the combined power and data circuit 134 provides routing and signal conditioning functionality for communication via one or more power and data connections 124a-c, and then to one or more trunk cables 20 within the network arrangement 10 of FIG. 1.

Figure 5:
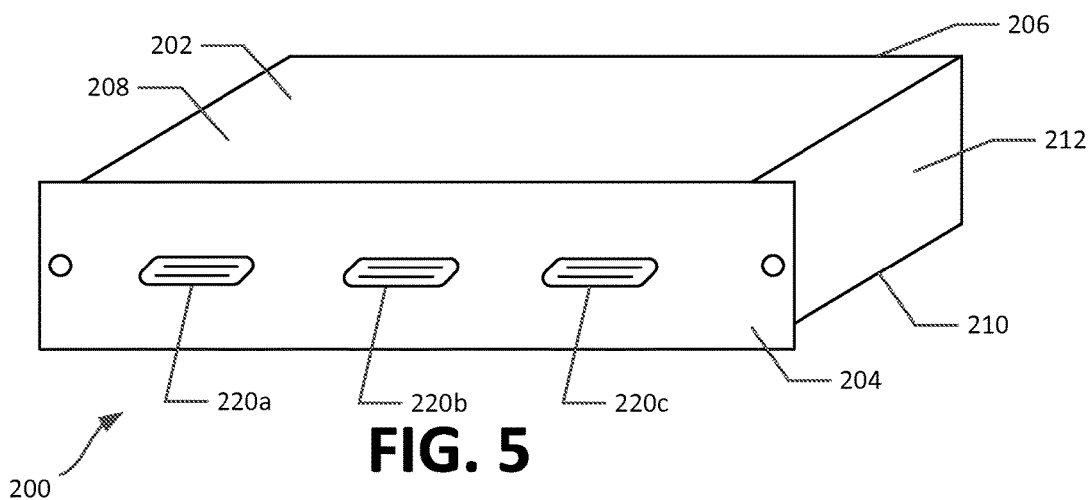
FIG. 5 is a schematic front perspective view of a zone data and power distribution panel, according to an example embodiment of the present disclosure.
Figure 6:
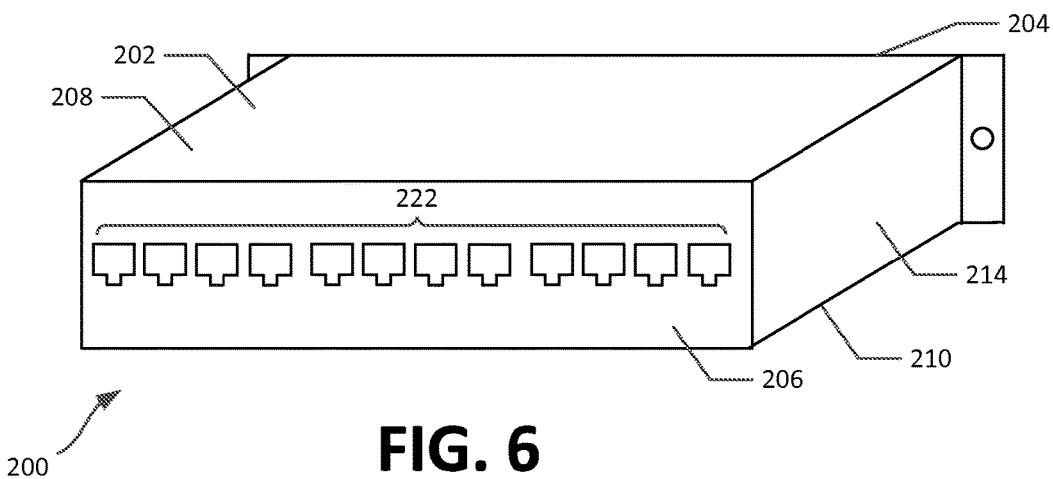
FIG. 6 is a schematic rear perspective view of the zone data and power distribution panel of FIG. 5.
Figure 7:
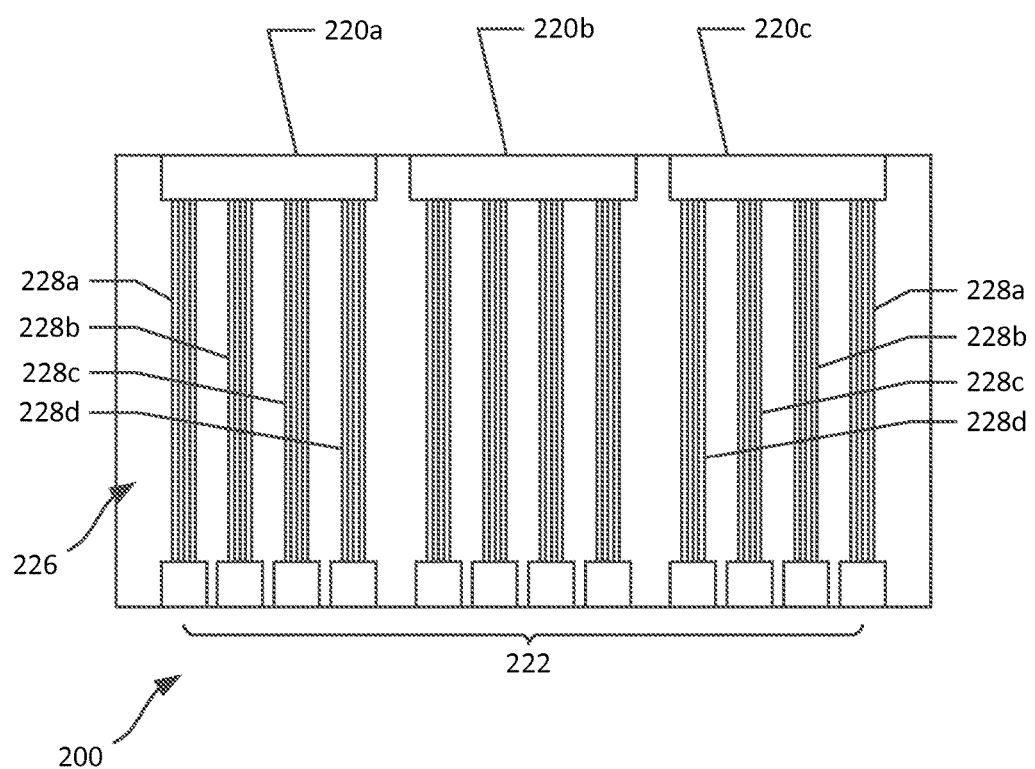
FIG. 7 is a schematic view of interconnections within the zone data and power distribution panel of FIG. 5.

Referring now to FIGS. 5-7, an example schematic illustration of a zone distribution panel 200 is illustrated. The zone distribution panel 200 as illustrated represents a component of a network arrangement 10 of FIG. 1 that receives multi-channel, combined power and data signals, and redistributes those signals across multiple individual data channels, as are described in Cat-5, Cat-6 and newer cabling standards, to remote equipment. In particular, the zone distribution panel 200 represents a point remote from the PoE distribution panel 100 of FIGS. 1-4 that receives power from the PoE distribution panel 100, and routes that power to remote devices, while also allowing data communication between the remote devices and the PoE distribution panel 100.

In the embodiment shown, the zone distribution panel 200 includes an enclosure 202 that has a front side 204 and a back side 206, as well as a top 208, bottom 210, and left and right sides 212, 216, respectively. In various embodiments in which the zone distribution panel 200 is located within an overall network, such a panel can be placed at various locations within a building, such as on each floor of a building or other arrangement based on the density of required data communications. In such embodiments, the zone distribution panel 200 is separate from a back office in which the PoE distribution panel 100 is located, and can be, for example, ceiling, floor, or wall mounted, or mounted within a separate closet and rack arrangement.

In the embodiment shown, the zone distribution panel 200 includes combined power and data connections 220a-c on a first side of the panel, and a second set of combined power and data connections 222 on a second side of the panel. In alternative embodiments, any of the connections could be located on any side of the panel; the arrangement depicted herein is provided for convenient illustration.

In the embodiment shown, the combined power and data connections 220a-c are configured to connect to a trunk cable, such as cables 20, 20', or 20'' of FIG. 1. In such embodiments, the combined power and data connections 220a-c can be constructed to use the MRJ21 format discussed above, and illustrated in further detail in connection with FIG. 8, below.

The second set of combined power and data connections 222 are constructed to receive various channels of power and data as routed from the combined power and data connections 220a-c. In some such embodiments, the data received at the second set of combined power and data connections 222 corresponds to a subset of the data at each of the combined power and data connections 220a-c. The zone distribution panel 200 includes routing circuitry 226 that acts to fan-out the power and data signals from one or more multi-channel trunk cables to separate channels and/or channel groupings. In the embodiment shown, each of the combined power and data connections 220a-c carries four separate channels 228a-d of data, each corresponding to data capable of being carried on a Cat-5 or Cat-6 wire; each of the connections of the second set of combined power and data connections 222 corresponds to a single such channel having data transmission characteristics as may be compatible with or analogous to Cat-5 or Cat-6 (or beyond) data transmission standards. In an example embodiment, each of the combined power and data connections 222 can correspond to an RJ-50 connection, which has five pairs of twisted pair wires. In such embodiments, each of the combined power and data connections 220a-c can be routed to four of the second set of combined power and data connections 222, thereby fanning-out a high-density, multi-channel trunk cable to multiple connections and cables having lower numbers of wires, and lower overall power and data throughput capabilities.

In the context of the present disclosure, and as discussed further below in connection with FIGS. 9-11 and 13, in some embodiments herein the RJ-50 connections can have customized pin assignments to allow for selectably delivering differing levels of power and data via combined power and data signals to remote devices, such as the module application items 400 of FIG. 1, from a PoE distribution panel 100 via a zone distribution panel 200, and an interface unit 300 associated with that device/item.

Referring now to FIG. 8, a schematic of an example pinout of an MRJ21 connector 500 is shown. The MRJ21 connector 500 can be used, for example, as a connection interface of a trunk cable configured to carry combined power and data signals within a network arrangement 10 such as the one shown in FIG. 1.

As illustrated in FIG. 8, the MRJ21 connector includes 24 pairs of wire connection locations, or 48 total wire connections. In a typical scenario of use, the MRJ21 connector could be useable to connect to up to six Category-5 or Category-6 cables, since each such cable only includes four pairs of wires. However, as discussed above, in many cases existing cables either cannot carry both power and data signals at when high data rates (e.g., 10 Gigabit) are involved, or may not be capable of carrying sufficient power to each endpoint, or module application item 400, even when lower data rates are involved. As such, in the present disclosure additional wires are allocated to be useable to route power to each interface unit 300 associated with a module application item 400, to ensure that devices typically connected to a data connection (e.g., a VoIP Phone, a WLAN access point (e.g., an 802.11a/b/g/n wireless access point, a network security device, an access control module, a WiMax connection point, a point-of-sale touch screen, a laptop, or other equipment) do not require an external power source.

In the embodiment shown, separate groups of wire pairs 502a-d are located at the extreme corners of the connector, and are respectively assigned to four separate channels. In this embodiment, each group includes four wire pairs, and as such are routed as if grouped for use in a Cat-5 or Cat-6 and beyond cabling. In addition, dedicated power signals can be transported, for each channel, on additional wire pairs. In the context of the present disclosure, a set of four wire pairs 504 located at a generally central location within the connector 500 can be used to deliver additional power, with one wire pair being associated with each of the channels associated with the separate groups of wire pairs 502a-d, respectively. As such, in this embodiment, each channel includes five wire pairs, with one wire pair dedicated to power delivery.

It is noted that although specific example positions for the wire pairs 502a-d and power wire pairs 504 are illustrated, other assignments could be possible as well. Furthermore, the MRJ21 connector 500 can correspond, in various embodiments, to a male or female type MRJ21 connector either mounted on a panel (e.g., panels 100, 200) or included at an end of a trunk cable 20, respectively.

Referring now to FIG. 9, an example schematic pinout of an RJ-50 connector 600 is shown that is useable in connection with the present disclosure to deliver combined power and data signals from a zone distribution panel 200 to an interface unit 300, for example via a cable 30. As illustrated and discussed herein, the RJ-50 connector can be an interface at the zone distribution panel 200 (e.g., as the second set of combined power and data connections 222), and can also be used at the interface unit 300. Generally, the RJ-50 connector can be, for example, an RJ-50 jack of a zone distribution panel 200 or interface unit 300, but could alternatively correspond to a pinout of a complementary RJ-50 plug to which such a jack is connected.

In an example embodiment of the present disclosure, each RJ-50 connector 600 has 10 contacts 602a-j, which are connectable to wires of a 5-pair wire as illustrated in FIG. 11, discussed below. Although in existing systems RJ-50 jacks utilize proprietary pin assignments, in the present application, the electrical contacts of the RJ-50 connector 600 are arranged to allow for dedicated power delivered on an outermost pair, and for the inner four pairs of wires to be arranged in a manner that is backwards-compatible with existing RJ-45 jacks used in Cat-5, Cat-6 and beyond interfaces. Namely, contacts 602a and 602j form an outer pair that typically does not contact an RJ-45 plug, but would contact an RJ-50 plug. Contacts 602b, 602c form a second pair, contacts 602d and 602g form a third pair, contacts 602e and 602f form a fourth pair, and contacts 602h and 602i form a fifth pair. The second through fifth pairs 602b-i are positioned to electrically connect to either an RJ-50 plug or an RJ-45 plug.

Table 1, below, illustrates the above discussed arrangement in the context of a jack providing Power-over-Ethernet, and in particular an arrangement in which an RJ-50 jack is compatible with either an RJ-50 plug or an RJ-45 plug. In particular, the table lists an arrangement of pins 1-10, corresponding to contacts 602a-j, that support combined power and data. In the example pin assignments shown there are four pairs (on Pins 2-9) in which the middle pairs are split, with pins 4 and 7 representing a first pair, and pins 5 and 6 representing a second pair (analogous to the 3-6 and 4-5 pairs of an RJ-45 connection), and the various modes for PoE+ according to IEEE 802.3at on pins 2-9 are supported:

TABLE 1

RJ-50 Pinout (Compatible with RJ-45)

| Pin Number | Data | Mode A | Mode B |
|---|---|---|---|
| Pin 1 |  | DC+ | DC+ |
| Pin 2 | Tx/Rx A+ | DC+ |  |
| Pin 3 | Tx/Rx A− | DC+ |  |
| Pin 4 | Tx/Rx B+ | DC− |  |
| Pin 5 | Tx/Rx C+ |  | DC+ |
| Pin 6 | Tx/Rx C− |  | DC+ |
| Pin 7 | Tx/Rx B− | DC− |  |
| Pin 8 | Tx/Rx D+ |  | DC− |
| Pin 9 | Tx/Rx D− |  | DC− |
| Pin 10 |  | DC− | DC− |

In embodiments discussed herein, each zone distribution panel 200 and interface unit 300 can be configured with an RJ-50 jack capable of delivery of both power and data across 10 contact springs, or 5 contact spring pairs. These contact springs interface with exposed wires of a complementary RJ-50 plug. In addition, the interface units 300 discussed herein can also use a similar RJ-50 jack, useable in conjunction with an RJ-50 or RJ-45 plug. By using RJ-50 connections at the zone distribution panel 200 and interface unit 300, additional wires can be routed to the interface unit 300 and associated module application items 400, thereby allowing the overall system to support a wider variety of module application items having higher power requirements, or power and high data throughput requirements. Furthermore, it is noted that the additional outermost wires of the RJ-50 interface can be used either as a substitute for, or in addition to, existing Power-over-Ethernet arrangements that would be available via an RJ-45 interface.

Figure 10A:
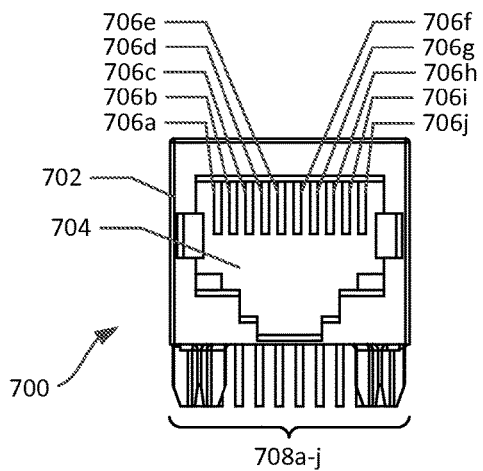
FIG. 10A is a front plan view of an RJ-50 jack useable to implement aspects of the present disclosure.
Figure 10B:
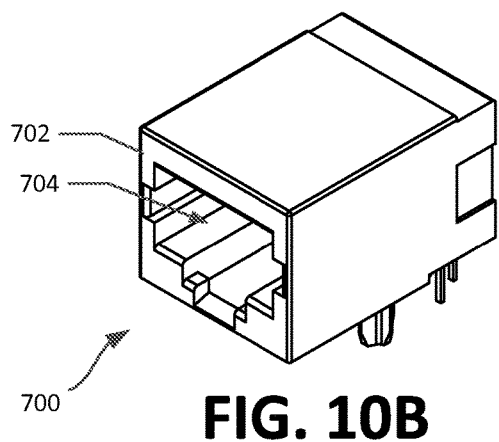
FIG. 10B is a top perspective view of the RJ-50 jack of FIG. 10A.
Figure 10C:
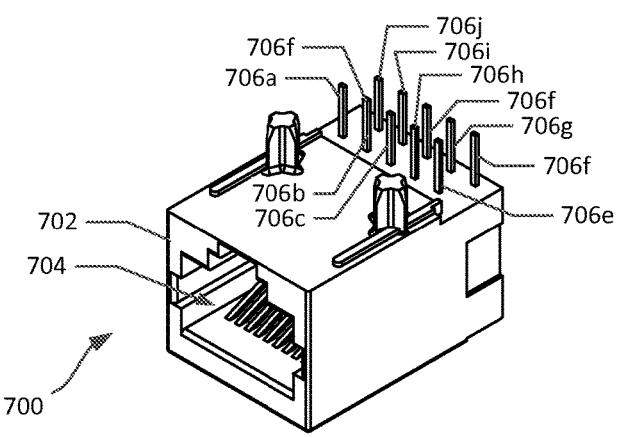
FIG. 10C is a bottom perspective view of the RJ-50 jack of FIG. 10A.
Figure 13:
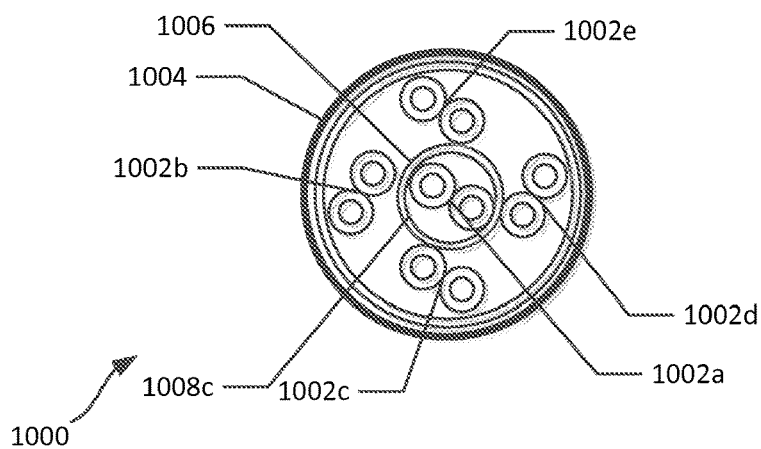
FIG. 13 illustrates an example cable construction for an interface cable useable to connect the zone data and power distribution panel with equipment powered therefrom.

As illustrated in FIGS. 10A-10C, an example of an RJ-50 jack 700 useable in a zone distribution panel is shown. The RJ-50 jack 700 includes a housing 702 that has a port 704 defining an opening for receiving a plug, such as the plug 800 shown in FIGS. 11A-C, discussed below. Within the port 704, contact springs 706a-j are exposed, and are disposed in a linear array for connection to corresponding wire connections of a plug. The contact springs 706a-j are electrically connected within the housing 702 to wire termination contacts 708a-j, respectively. The wire termination contacts 708 are configured to electrically connect to wires or electrical leads of a circuit board. In the embodiment shown, the wire termination contacts 708a-j are illustrated as pins useable to connect to leads on a circuit board, such as would be present in a zone distribution panel. In alternative embodiments, the wire termination contacts 708a-j can correspond to insulation displacement connectors, or other types of connectors to which exposed wires of a channel cable could be connected (an example of which is shown in FIG. 13, discussed below). In such embodiments, the RJ-50 jack 700 might be useable in a wall outlet or other stand-alone configuration, such as may be the case if implemented as part of an interface unit 300.

Optionally, circuitry within such a plug can be used to monitor and manage signal degradation or signal correction performance (e.g., in the case of crosstalk or return loss). Examples of RJ-45 jacks analogous to such an RJ-50 jack are disclosed in U.S. Pat. Nos. 7,381,098, 7,402,085, 7,787, 615, and 8,151,457, the disclosures of which are hereby incorporated by reference in their entireties.

Figure 11A:
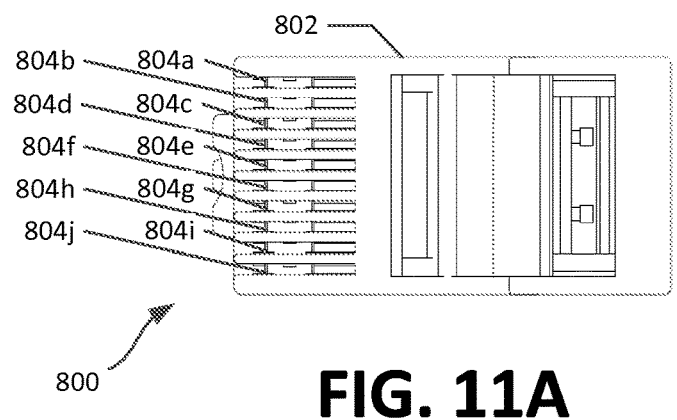
FIG. 11A is a bottom plan view of an RJ-50 plug useable to implement aspects of the present disclosure.
Figure 11B:
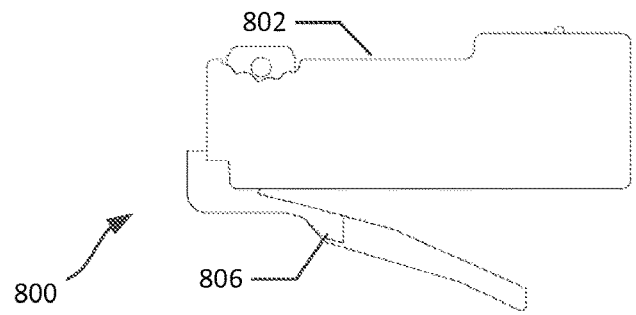
FIG. 11B is a side plan view of the RJ-50 plug of FIG. 11A.
Figure 11C:
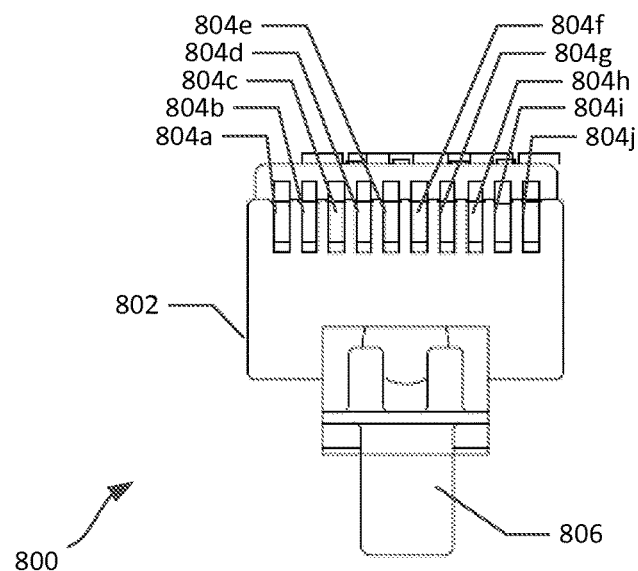
FIG. 11C is a front plan view of the RJ-50 plug of FIG. 11A.

Referring now to FIGS. 11A-C, an example RJ-50 plug 800 is shown, which can be used in connection with the RJ-50 jack 700 of FIGS. 10A-C to implement aspects of the present disclosure. The RJ-50 plug 800 can be used to connect cabling, such as that shown in FIG. 13, between equipment using RJ-50 jacks, such as a zone distribution panel 200 and an interface unit 300.

In the embodiment shown, the RJ-50 plug 800 has a body sized and shaped to fit within the port 704 of the RJ-50 jack 700, and includes wire contacts 804a-j and a retention clip 806. The wire contacts 704a-j expose wires of a 5-pair cable for connection to the contact springs 806a-j. The retention clip 806 is a resiliently compressible latching mechanism useable to retain the RJ-50 plug 800 within the port 704 when inserted.

Referring to FIGS. 9-11 generally, t is noted that, while an existing RJ-45 interface allows for combined power and data over some wires, current standards only allow such power delivery at data speeds of 1 gigabit per second or less, and the typical thickness of the wire used in Cat-5 and Cat-6 cabling (24 AWG) allows for approximately 300 milliamps to be delivered across each pair. Accordingly, based on the maximum voltage difference in a PoE arrangement of about 50.0-57.0 volts, a maximum power at each socket is usually about 17.1 watts multiplied by two (since each wire in a pair can be used), leading to about 34.2 watts of maximum output power from a traditional RJ-45 socket. Using an additional set of contacts at Pins 1 and 10 (e.g., contacts 602a, 602j), and additional 17.1 watts (and 300 milliamps) can be delivered to each interface unit 300 and associated module application item 400, thereby vastly increasing the overall power output from the PoE distribution panel 100.

Referring back to FIGS. 1 and 2-4, it is noted that, because of the differing types of equipment that may be included in an overall network arrangement 10, there may be instances where some or all of the equipment may require less power and greater data speeds, or may require higher power and operate sufficiently using existing data speeds (e.g., speeds supported by 802.3at PoE standards and Cat-5 cabling). As such, in some embodiments, some or all of the circuitry included in the PoE distribution panel 100, such as the data conversion circuit 132 or combined power and data circuit 134, can be configured to include a microcontroller or other configurable, switching arrangement configured to allow either (1) PoE distribution, in which power and data are routed at least some of the inner pairs of the RJ-50 connectors (i.e., contacts 602b-i, or Pins 2-9), or (2) maximum data throughput with accompanying power only delivered on the pins not contacted by an RJ-45 plug (i.e., contacts 602a, 602j, or Pins 1 and 10).

In some embodiments, the PoE distribution panel 100, because it has combined power and data connections 124a-c that are routed via the zone distribution panels 200 to different RJ-50 connections (e.g., connections 222), it is possible for the PoE distribution panel 100 to deliver one of two modes on a per-connection basis: (1) in a first mode, the PoE distribution panel 100 can be configured to store a routing configuration to deliver power only via signals that eventually route to contacts 502a and 602j (Pins 1 and 10) of each connection, and deliver greater than Cat-5-compatible speeds on the contacts 602b-i representing the "middle" pairs (Pins 2-9) of that connection, and (2) in a second mode, the PoE distribution panel 100 can be configured to store a routing configuration to deliver power via both the outer contacts 602a, 602j, and according to traditional PoE standards (e.g., via mode A or mode B) on the middle pairs 602b-i, illustrated in Table 1, above. It is noted that although in some embodiments the PoE distribution panel 100 can do so on an overall basis, or on a connection-by-connection basis for each of the combined power and data connections 124a-c, in some alternative embodiments the panel 100 can track each of connections 222 in a routing table to individually switch among power and data delivery modes. Such modes can be switched via direct programming of the PoE distribution panel 100, by remote programming access of the panel 100, or by packet and data inspection associated with received data signals.

It is noted that, in use, installation of panels 100, 200 at a premises, alongside interface units 300, may be performed in which RJ-50 plugs are used at fewer than all of the connections 222 of the zone distribution panel. In such embodiments, an installer may elect to directly connect telecommunications equipment to the connections 222 using an RJ-45 connection, and receive less than all of the power capable of being delivered via each of the connections 222. Other possible arrangements of equipment (e.g., module application items 400) and connections to a zone distribution panel 200 are possible as well.

Now referring now to FIGS. 12-13, various constructions of data cables are illustrated that can be used to carry combined power and data signals, according to various embodiments of the present disclosure. In particular, FIG. 12 illustrates an example construction of a cable 900 that is useable as trunk cable 20, 20' or 20" of FIG. 1, and useable in conjunction with the MRJ21 connector interface 500 of FIG. 8. FIG. 13 illustrates an example construction of a cable 1000 that is useable as a cable of an individual channel 30, as illustrated in FIG. 1, and useable in conjunction with a plug implementing an RJ-50 interface.

In particular, the cable 900 of FIG. 12 includes a group of four separate channels 902a-d, each of which includes five separate twisted pairs 704a-e surrounded by a channel jacket 906a-d, respectively. Each twisted pair 904a-e includes a pair of wires, each of which has a jacket thereon. Of the five separate twisted pairs 904a-e, a first twisted pair 904a is positioned generally centrally within the channel 902a-d, within a separate inner jacket 908a-d, respectively, and surrounded by the remaining twisted pairs 904b-e. In such embodiments, the twisted pair 904a can be connected to power wire pairs 504 of an MRJ21 interface 500, for eventual routing to an outer pair of an RJ-50 interface (i.e., Pins 1 and 10). The remaining twisted pairs 904b-e are connected to pins within one of the separate groups of wire pairs 502a-d, each corresponding to one of the channels 902a-d. The overall cable 900 has an outer jacket 910, surrounding all of the channels 902a-d by surrounding each of the four channel jackets 906a-d.

In example embodiments, one or more of the jackets 906a-d, 908, 910 can include one or more layers. For example, in some such embodiments, jackets can include a shielding layer and a protective layer, thereby reducing crosstalk between differential signals in the differing channels 902a-d. In still further embodiments, the overall cable can include a shielding layer in association with the outer jacket 910, preventing signal degradation from electromagnetic interference. In additional embodiments, the inner jacket 908a-d can be shielded to electrically isolate the DC power delivery pair 904a from the combined power and data delivery pairs 904b-e. In example embodiments, each of the wires of each twisted pair 904a-e is a 24AWG wire, consistent with Cat-5 specifications; however, in some embodiments, at least the innermost pair 904a can have a greater gauge, allowing for increased power delivery via those dedicated power delivery wires.

It is noted that by aggregating multiple channels of wires, power delivery from each connection 500, and via cable 900, can be calculated, and is observed to be substantially higher in the case where power is delivered only via an RJ-45 connection. For example, in the embodiment shown in FIGS. 8 and 12, 12 pairs are used to deliver power (four dedicated pairs in the power wire pairs 504, 902a, as well as two wire pairs each per channel in the four separate groups of wire pairs 502a-d, connected to wires 904b-e in each of channels 902a-d), leading to a total power delivery of 240 watts. Because a maximum current for 24 AWG cable is typically considered 360 milliamps, a maximum current for the 12 pairs is about 4.32 amps, assuming the 50-57 volt signal threshold useable in PoE systems that use twisted pair signaling.

In FIG. 13, the cable 1000 is constructed for use in connection with an RJ-50 connector interface, such as the connector 600 of FIG. 9, or the jack 700 or plug 800 of FIGS. 10-11. The cable 1000 generally corresponds to a single channel version of the cable 900 of FIG. 12, and is useable as either the cable connecting the channel 30 between the zone distribution panel 200 and the interface unit 300 of FIG. 1, or between the interface unit 300 and a module application item 400. The cable 1000 generally includes five wire pairs 1002a-e surrounded by an outer jacket 1004, with a first wire pair 1002a surrounded by an inner jacket 1006. One or both of the jacket 1004 and the inner jacket 1006 can include shielding, to electrically isolate the wire pair 1002a from the remaining wire pairs 1002b-e, and isolating all of the wire pairs 1002a-e from an outside environment. In the embodiment shown, the first wire pair 1002a can be electrically connected to the outermost pins (Pins 1 and 10) of an RJ-50 interface and are dedicated to power delivery, while the remaining wire pairs 1002b-e can be routed to Pins 2-9 of the RJ-50 interface, with the pairs assigned in a manner to be compatible with a four pair interface as would be present in an RJ-45 connector interface (e.g., with a split pair on Pins 4-7 and 5-6).

Referring to FIGS. 9 and 13, it is noted that power delivery from each connection 600, and via cable 1000, can be calculated, and is observed to be substantially higher in the case where power is delivered only via an RJ-45 connection. For example, in the embodiment shown, 3 pairs are used to deliver power (a dedicated power pair 1002a connected to Pins 1 and 10 (connections 602a, 602j), as well as two pairs of combined power and data across two of the four wire pairs 1002b-e, depending on what mode of PoE is selected (as noted in Table 1). Based on the three wire pairs delivering power at up to 20 watts per pair, a total of 60 watts could be delivered per channel via the cable 1000 and interface 600. This results from a total current of 360 milliamps per pair or a total of 1.08 amps per channel, and assumes 50.0-57.0 volt signal threshold useable in PoE systems that use twisted pair signaling.

Referring to FIGS. 1-13 generally, it is recognized that the systems disclosed herein have a number of advantages over existing systems, in particular relating to routing and distribution of power and data at a facility. It is noted that, via the overall network arrangement 10 of FIG. 1, and as implemented using the PoE distribution panel 100 and zone distribution panel 200, it is possible to provide sufficient power to the various module application items 400 such that no separate power connections need be provided, for example via a wall outlet or some other arrangement.

In accordance with FIGS. 1-13, it is noted that the present application generally recites a telecommunications panel including a panel housing having a first side and a second side; one or more data connectors on the first side; a power input signal connector on the first side; one or more combined power output and data signal connectors on the second side, each of the combined power output and data signal connectors configured to electrically connect to a twisted pair cable, each of the one or more combined power output and data signal connectors including a plurality of twisted pairs each having first and second wire contacts; wherein one or more of the twisted pairs are configured to carry a power signal as a direct current voltage difference between the first and second wire contacts; wherein the remaining twisted pairs from the plurality of twisted pairs are configured to carry differential data signals; and wherein the telecommunications panel is configured to selectably allow pairs of the remaining twisted pairs from the plurality of twisted pairs to cooperate to carry a power signal.

In example embodiments, one or more of the following features can be incorporated. The one or more data connectors on the first side are electrically connected to the one or more combined power output and data signal connectors on the second side. The power input signal on the first side is electrically connected to the one or more combined power output and data signal connectors on the second side. The one or more data connectors includes an optical data connector. The one or more data connectors includes a twisted pair electrical data connector. The one or more combined power output and data signal connectors is an MRJ21 connector. The telecommunications panel has first and second communication modes, the first mode providing a first communication frequency and applying a power signal across a plurality of the remaining twisted pairs from the plurality of twisted pairs, and the second mode providing a second communication frequency higher than the first communication frequency and lacking the power signal across the remaining twisted pairs from the plurality of twisted pairs.

A telecommunications panel also can include a panel housing having a first side and a second side; a combined power input and data signal connector on the first side; a plurality of combined power output and data signal connectors on the second side, each of the plurality of combined power output and data signal connectors electrically connected to power and data signals from the combined power input and data signal connector and configured to electrically connect to a twisted pair cable and including electrical contact springs positioned for connection to at least first, second, third, and fourth twisted pairs each having first and second wire contacts; wherein the first, second, third, and fourth twisted pairs are each configured to carry a differential data signal; wherein the telecommunications panel is configured to selectably allow the second and third twisted pairs to cooperate to carry a power signal; and wherein the telecommunications panel is configured to selectably allow the first and fourth twisted pairs to cooperate to carry a power signal.

In example embodiments, one or more of the following features can be incorporated. At least one of the combined power output and data signal connectors is configured to electrically connect to a twisted pair cable and includes electrical contact springs positioned for connection to a fifth twisted pair, wherein the fifth twisted pair is configured to carry a power signal as a direct current voltage difference between the first and second wire contacts. The combined power input and data signal connector is an MRJ21 connector. One or more of the plurality of the combined power output and data signal connectors is an RJ-50 connector. The telecommunications panel has first and second communication modes, the first mode providing a first communication frequency and applying a power signal across a plurality of the remaining twisted pairs from the plurality of twisted pairs, and the second mode providing a second communication frequency higher than the first communication frequency and lacking the power signal across at least some of the remaining twisted pair connectors from the plurality of twisted pair connectors.

A telecommunications system can include a first telecommunications panel comprising: one or more data connectors; a power input signal connector; and one or more combined power output and data signal connectors, each configured to electrically connect to a twisted pair cable, each of the one or more combined power output and data signal connectors including a plurality of twisted pairs each having first and second wire contacts, wherein one or more of the twisted pairs configured to carry a power signal as a direct current voltage difference between the first and second wire contacts and the remaining twisted pairs from the plurality of twisted pairs are configured to carry differential data signals; wherein the telecommunications panel is configured to selectably allow pairs of the remaining twisted pairs from the plurality of twisted pairs to cooperate to carry a power signal. The system can also include a second telecommunications panel including: a combined power input and data signal connector communicatively connected to a cable leading from one of the one or more combined power output and data signal connectors of the first telecommunications panel; and a plurality of combined power output and data signal connections, each of the plurality of combined power output and data signal connectors configured to electrically connect to a twisted pair cable and including electrical contact springs positioned for connection to at least first, second, third, and fourth, twisted pairs each having first and second wire contacts.

In example embodiments, one or more of the following features can be incorporated. A first twisted pair is configured to carry a power signal as a direct current voltage difference between the first and second wire contacts. The telecommunications panel is configured to selectably allow the third and fourth twisted pair to cooperate to carry a power signal. The telecommunications panel is configured to selectably allow the second twisted pair to cooperate with a fifth twisted pair also connected to electrical contact springs of the combined power output and data signal connector to carry a power signal. The second, third, and fourth twisted pairs are each configured to carry a differential data signal.

A networked system can include a first telecommunications device configured to receive power signals and data signals and transmit combined power and data signals over one or more twisted pair cables, each of the twisted pair cables including a plurality of data channels; and a second telecommunications device remote from the first telecommunications device, the second telecommunications device configured to electrically connect to one or more of the first twisted pair cables, the second telecommunications device including a plurality of single channel combined power and data twisted pair connectors.

In example embodiments, one or more of the following features can be incorporated. The second telecommunications device is configured to transmit on the single channel combined power and data twisted pair connectors one data channel of the plurality of data channels in the one or more first twisted pair cables. The single channel combined power and data twisted pair connector is an RJ-45 connector. The single channel combined power and data twisted pair connector is an RJ-50 connector.

A twisted pair cable can include a first twisted pair including first and second wires each including a conductor and an outer insulator; an inner jacket surrounding the first twisted pair; a plurality of twisted pairs each comprising first and second wires each including a conductor and an outer insulator, the plurality of twisted pairs externally adjacent to the inner jacket; and an outer jacket surrounding the plurality of twisted pairs and the inner jacket.

In example embodiments, one or more of the following features can be incorporated. The first twisted pair is configured to carry a power signal as a direct current voltage differential across the first and second wires. Each twisted pair of the plurality of twisted pairs is configured to carry data as a differential signal. The plurality of twisted pairs includes a first, second, third, and fourth twisted pair. The first and second twisted pairs are configured to cooperate to carry power as a direct current voltage differential. The third and fourth twisted pairs are configured to cooperate to carry power as a direct current voltage differential. A connector can be electrically connected at an end of the twisted pair cable, the connector comprising an RJ-50 connector. The RJ-50 connector has first, second, third, fourth, fifth, sixth, seventh, eighth, ninth, and tenth consecutively arrayed electrical contacts, the first and tenth electrical contacts electrically connected to the first and second wires of the first twisted pair.

A twisted pair cable can include five twisted pairs and one outer jacket surrounding a portion of the twisted pairs, wherein each twisted pair includes a first and second wire, wherein each wire includes a conductor and an outer insulator, and wherein one of the twisted pairs is separately surrounded by an inner jacket.

In example embodiments, one or more of the following features can be incorporated. The twisted pair that is separately surrounded by an inner jacket is configured to carry a power signal as a direct current voltage differential across the first and second wires. The four twisted pairs positioned externally to the inner jacket by an inner jacket are each configured to carry data as a differential signal. A first and second twisted pair from the four twisted pairs that are not surrounded by the inner jacket are configured to cooperate to carry power as a direct current voltage differential.

A twisted pair cable can include four inner twisted pair cables, each inner twisted pair cable including: a first twisted pair comprising first and second wires each including a conductor and an outer insulator; an inner jacket surrounding the first twisted pair; a plurality of twisted pairs each comprising first and second wires each including a conductor and an outer insulator, the plurality of twisted pairs external to the inner jacket; and an outer jacket surrounding the plurality of twisted pairs and the inner jacket.

In example embodiments, one or more of the following features can be incorporated. The inner jacket comprises a shield. The outer jacket comprises a shield. The cable includes a connector electrically connected at an end of the twisted pair cable, the connector comprising an MRJ21 connector.

A twisted pair cable assembly can include a plurality of inner twisted pair cables, each inner twisted pair cable including: a first twisted pair comprising first and second wires each including a conductor and an outer insulator, the first twisted pair configured to carry a power signal as a direct current voltage differential across the first and second wires; an inner shield surrounding the first twisted pair; a second, third, fourth, and fifth twisted pair each comprising first and second wires each including a conductor and an outer insulator, the second, third, fourth, and fifth twisted pairs externally adjacent to the inner shield, the second, third, fourth, and fifth twisted pairs configured to carry data as a differential signal, the second and third twisted pairs configured to cooperate to carry power as a direct current voltage differential, the fourth and fifth twisted pairs configured to cooperate to carry power as a direct current voltage differential; and an outer shield surrounding the second, third, fourth, and fifth twisted pairs and the inner shield; wherein each of the inner twisted pair cables corresponds to an RJ-50-compatible cable.

In example embodiments, one or more of the following features can be incorporated. The plurality of inner twisted pair cables includes four inner twisted pair cable, and wherein the twisted pair cable assembly includes an MRJ21 connector electrically connected to the cable at an end of the cable. The outer shield provides electrical shielding of one of the inner twisted pair cables relative to the other of the inner twisted pair cables. The assembly includes a jacket surrounding all of the inner twisted pair cables.

A wired telecommunications interface can include a housing; first, second, third, fourth, fifth, sixth, seventh, eighth, ninth, and tenth consecutively arranged electrical contacts held in an array by the housing and positioned to electrically contact a complementary interface; wherein the second and the third electrical contacts are associated with a first wire pair; wherein the fourth and the seventh electrical contacts are associated with a second wire pair; wherein the fifth and the sixth electrical contacts are associated with a third wire pair; wherein the eighth and the ninth electrical contacts are associated with a fourth wire pair; and wherein the first, second, third, and fourth wire pairs are configured to carry data as a differential signal.

In example embodiments, one or more of the following features can be incorporated. The first and tenth electrical contacts are associated with a fifth wire pair and configured to carry a power signal as a direct current voltage difference between the first and tenth electrical contacts. The first and second wire pairs are configured to selectably cooperate to carry a power signal. The power signal is carried as a direct current voltage differential between the first pair of wires and the second pair of wires. The third and fourth wire pairs are configured to selectably cooperate to carry a power signal. The power signal is carried as a direct current voltage differential between the first pair of wires and the second pair of wires. The telecommunications interface comprises a telecommunications jack. The jack comprises an RJ-50 jack. The telecommunications interface comprises a telecommunications plug.

A telecommunications jack can include a housing defining a port for receiving a plug; first, second, third, fourth, fifth, sixth, seventh, eighth, ninth, and tenth consecutively arranged contact springs adapted to make electrical contact with the plug when the plug is inserted into the port of the housing; first, second, third, fourth, fifth, sixth, seventh, eighth, ninth, and tenth consecutively arranged wire termination contacts for terminating wires to the jack, each termination contact electrically connected to the corresponding contact spring; wherein the second and the third wire termination contacts form a pair for transmitting and receiving data over a twisted wire pair; wherein the fourth and the seventh wire termination contacts form a pair for transmitting and receiving data over a twisted wire pair; wherein the fifth and the sixth wire termination contacts form a pair for transmitting and receiving data over a twisted wire pair; and wherein the eighth and the ninth wire termination contacts form a pair for transmitting and receiving data over a twisted wire pair.

In example embodiments, one or more of the following features can be incorporated. The first and tenth wire termination contacts form a pair for establishing a voltage differential useable to transmit or receive power over a twisted wire pair. The first and tenth wire termination contacts are not configured to communicate data over a twisted wire pair. The first and second wire pairs are configured to selectably cooperate to carry a power signal as a direct current voltage differential between the first pair of wires and the second pair of wires. The third and fourth wire pairs are configured to selectably cooperate to carry a power signal as a direct current voltage differential between the third pair of wires and the fourth pair of wires. The jack comprises an RJ-50 jack. The first, second, third, fourth, fifth, sixth, seventh, eighth, ninth, and tenth consecutively arranged contact springs are configured to mate to an RJ-50 plug. The telecommunications jack is configurable for use in first and second communication modes, the first mode providing a first communication frequency and applying a power signal across at least the first and tenth wire termination contacts and at least one other pair, and the second mode providing a second communication frequency higher than the first communication frequency and lacking the power signal across the at least one other pair.

A telecommunications jack can include a housing defining a port for receiving an RJ-50 plug; first, second, third, fourth, fifth, sixth, seventh, eighth, ninth, and tenth consecutively arranged contact springs adapted to make electrical contact with the plug when the plug is inserted into the port of the housing; first, second, third, fourth, fifth, sixth, seventh, eighth, ninth, and tenth consecutively arranged wire termination contacts for terminating wires to the jack, each termination contact electrically connected to the corresponding contact spring and associated with one of a plurality of differential pairs, the first and tenth wire termination contacts associated with a first differential pair, the second and third wire termination contacts associated with a second differential pair, the fourth and seventh wire termination contacts associated with a third differential pair, the fifth and sixth wire termination contacts associated with a fourth differential pair, and the eighth and ninth wire termination contacts associated with a fifth differential pair; wherein at least two wire pairs are configured to selectably cooperate to carry a power signal as a direct current voltage differential between the pairs of wires.

In example embodiments, one or more of the following features can be incorporated. The first and tenth wire termination contacts are not configured to communicate data over a twisted wire pair. The telecommunications jack is compatible with an RJ-45 plug, wherein the second, third, fourth, fifth, sixth, seventh, eighth, and ninth consecutively arranged contact springs electrically connect to wires of the RJ-45 plug.

A method of delivering power and data over a twisted pair cable can include transmitting a power signal as a direct current voltage differential across the first and second wire in a first twisted pair of a cable; transmitting data as differential signal across a first and second wire in at least a second, third, fourth, and fifth twisted pair of a cable; and transmitting a power signal as a direct current voltage differential across two of second, third, fourth, and fifth twisted pairs.

In example embodiments, one or more of the following features can be incorporated. In a first mode, the second twisted pair operates at a first direct current voltage. In the first mode, the third twisted pair operates at a second direct current voltage. In the first mode, the first direct current voltage and the second direct current voltage are different from each other, thereby providing a direct current voltage difference between the second and third twisted pairs. The method can include switching to a second mode in which a direct current voltage of the second and third twisted pairs lack a direct current voltage difference. A data bandwidth in the second mode is greater than a data bandwidth of the twisted pair cable in the first mode. The twisted pair cable comprises an RJ-50 cable. The twisted pair cable comprises an MRJ21 cable including a plurality of RJ-50 cables. In a first mode, the fourth twisted pair operates at a first direct current voltage and the fifth twisted pair operates at a second direct current voltage different from the first direct current voltage, thereby providing a direct current voltage difference between the fourth and fifth twisted pairs. The method can also include receiving the power signal and the data at a connector of a power and data distribution panel. The panel is configurable to operate in first or second modes, the first mode having a data throughput lower than in the second mode, the first mode having a maximum power delivery threshold that is greater than a maximum power delivery of the second mode.

A method of delivering power and data from a telecommunications panel can include transmitting a combined power output signal and data signals at a twisted pair connector of a telecommunications panel, the power output signal provided as a direct current voltage difference across connections associated with a first wire pair electrically connected to the twisted pair connector and the data signals provided as differential signals at connections associated with a plurality of wire pairs also electrically connected to the twisted pair connector; and switching, at the telecommunications panel, from a first mode to a second mode to deliver power as a voltage difference across two of the plurality of wire pairs.

In example embodiments, one or more of the following features can be incorporated. The method can include receiving, at the telecommunications panel, a separate power signal and data signals. The method can include electrically connecting equipment to the combined power output signal and data signals at a second twisted pair connector located on the equipment, wherein the power output signal is used to provide electrical power to the equipment. The combined power output signal and data signals includes a plurality of data channels. The method can include electrically connecting the telecommunications panel to a second telecommunications panel remote from the telecommunications panel, the second telecommunications panel receiving the combined power output signal and data signals and distributing combined power output and data signals associated with each channel onto a separate twisted pair connector, the second telecommunications panel including a plurality of separate twisted pair connectors. The twisted pair connector comprises an MRJ21 connector. The telecommunications panel includes a power input connector and a data connector, the telecommunications panel combining signals from the power input connector and the data connector at the twisted pair connector transmitting the combined power output signal and data signals.

A method of delivering power and data in a telecommunications system can include receiving a power signal at a power connector of a first telecommunications panel; receiving a data signal at a data connector of the first telecommunications panel; transmitting a combined power output and data signal from a multichannel twisted pair connector of the first telecommunications panel, the combined power output and data signal based on the received power signal and data signal; receiving the combined power output and data signal at a multichannel twisted pair connector of a second telecommunications panel; distributing the combined power output and data signal to a plurality of single channel twisted pair connectors; receiving at a telecommunications device, the combined power output and data signal, thereby powering the device and communicating data to the telecommunications device.

In example embodiments, one or more of the following features can be incorporated. The telecommunications device does not require a separate power source. The multichannel twisted pair connector comprises an MRJ21 connector, and the plurality of single channel twisted pair connectors comprise RJ-50 connectors.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A telecommunications panel comprising:
    a panel housing having a first side and a second side;
    one or more data connectors on the first side;
    a power input signal connector on the first side;
    one or more combined power output and data signal connectors on the second side, each of the combined power output and data signal connectors configured to electrically connect to a twisted pair cable, each of the one or more combined power output and data signal connectors including a plurality of twisted pairs each having first and second wire contacts;
    wherein one or more of the twisted pairs is configured to carry a power signal as a direct current voltage difference between the first and second wire contacts;
    wherein the remaining twisted pairs from the plurality of twisted pairs are configured to carry differential data signals; and
    wherein the telecommunications panel is configured to selectably allow pairs of the remaining twisted pairs from the plurality of twisted pairs to cooperate to carry a power signal as a direct current voltage differential in combination with the differential data signals concurrently with the one or more of the twisted pairs carrying the power signal.

2. The telecommunications panel of claim 1, wherein the one or more data connectors on the first side are electrically connected to the one or more combined power output and data signal connectors on the second side.

3. The telecommunications panel of claim 1, wherein the power input signal on the first side is electrically connected to the one or more combined power output and data signal connectors on the second side.

4. The telecommunications panel of claim 1, wherein the one or more data connectors includes an optical data connector.

5. The telecommunications panel of claim 1, wherein the one or more data connectors includes a twisted pair electrical data connector.

6. The telecommunications panel of claim 1, wherein the one or more combined power output and data signal connectors is an MRJ21 connector.

7. The telecommunications panel of claim 1, wherein the telecommunications panel has first and second communication modes, the first mode providing a first communication frequency and applying a power signal across a plurality of the remaining twisted pairs from the plurality of twisted pairs, and the second mode providing a second communication frequency higher than the first communication frequency and lacking the power signal across the remaining twisted pairs from the plurality of twisted pairs.

8. A telecommunications panel comprising:
    a panel housing having a first side and a second side;
    a combined power input and data signal connector on the first side;
    a plurality of combined power output and data signal connectors on the second side, each of the plurality of combined power output and data signal connectors electrically connected to power and data signals from the combined power input and data signal connector and configured to electrically connect to a twisted pair cable and including electrical contact springs positioned for connection to at least first, second, third, and fourth twisted pairs each having first and second wire contacts;
    wherein the first, second, third, and fourth twisted pairs are each configured to carry a differential data signal;
    wherein the telecommunications panel is configured to selectably allow the second and third twisted pairs to cooperate to carry a power signal as a direct current voltage differential in combination with the differential data signal; and
    wherein the telecommunications panel is configured to selectably allow the first and fourth twisted pairs to cooperate to carry a power signal as a direct current voltage differential in combination with the differential data signal; and wherein at least one of the combined power output and data signal connectors is configured to electrically connect to a twisted pair cable and includes electrical contact springs positioned for connection to a fifth twisted pair, wherein the fifth twisted pair is configured to carry a power signal as a direct current voltage difference between the first and second wire contacts concurrently with either (1) the second and third twisted pairs carrying the power signal or (2) the first and fourth twisted pairs carrying the power signal.

9. The telecommunications panel of claim 8, wherein the combined power input and data signal connector is an MRJ21 connector.

10. The telecommunications panel of claim 8, wherein one or more of the plurality of the combined power output and data signal connectors is an RJ-50 connector.

11. The telecommunications panel of claim 8, wherein the telecommunications panel has first and second communication modes, the first mode providing a first communication frequency and applying a power signal across a plurality of the remaining twisted pairs from the plurality of twisted pairs, and the second mode providing a second communication frequency higher than the first communication frequency and lacking the power signal across at least some of the remaining twisted pair connectors from the plurality of twisted pair connectors.

12. A telecommunications system including:
a first telecommunications panel comprising:
one or more data connectors;
a power input signal connector; and
one or more combined power output and data signal connectors, each configured to electrically connect to a twisted pair cable, each of the one or more combined power output and data signal connectors including a plurality of twisted pairs each having first and second wire contacts, wherein one or more of the twisted pairs configured to carry a power signal as a direct current voltage difference between the first and second wire contacts and the remaining twisted pairs from the plurality of twisted pairs are configured to carry differential data signals concurrently with the one or more of the twisted pairs carrying the power signal;
wherein the telecommunications panel is configured to selectably allow pairs of the remaining twisted pairs from the plurality of twisted pairs to cooperate to carry a power signal in combination with the differential data signals; and
a second telecommunications panel including:
a combined power input and data signal connector communicatively connected to a cable leading from one of the one or more combined power output and data signal connectors of the first telecommunications panel; and
a plurality of combined power output and data signal connections, each of the plurality of combined power output and data signal connectors configured to electrically connect to a twisted pair cable and including electrical contact springs positioned for connection to at least first, second, third, and fourth, twisted pairs each having first and second wire contacts.

13. The system of claim 12, wherein a first twisted pair is configured to carry a power signal as a direct current voltage difference between the first and second wire contacts.

14. The system of claim 13, wherein the telecommunications panel is configured to selectably allow the third and fourth twisted pair to cooperate to carry a power signal.

15. The system of claim 13, wherein the telecommunications panel is configured to selectably allow the second twisted pair to cooperate with a fifth twisted pair also connected to electrical contact springs of the combined power output and data signal connector to carry a power signal.

16. The system of claim 12, wherein the second, third, and fourth twisted pairs are each configured to carry a differential data signal.

17. The system of claim 16, wherein the second telecommunications device is configured to transmit on the single channel combined power and data twisted pair connectors one data channel of the plurality of data channels in the one or more first twisted pair cables.

18. The system of claim 16, wherein the single channel combined power and data twisted pair connector is an RJ-45 connector.

19. The system of claim 16, wherein the single channel combined power and data twisted pair connector is an RJ-50 connector.

20. A networked system comprising:
a first telecommunications device configured to receive power signals and data signals and transmit combined power and data signals over one or more twisted pair cables, each of the twisted pair cables including a plurality of data channels, each of the data channels comprising a plurality of pairs of differential signaling wires;
a second telecommunications device remote from the first telecommunications device, the second telecommunications device configured to electrically connect to one or more of the first twisted pair cables, the second telecommunications device including a plurality of single channel combined power and data twisted pair connectors;
wherein the plurality of pairs of differential signaling wires of the plurality of data channels includes a first pair configured to carry a direct current voltage signal as a voltage differential across the pair and a plurality of remaining pairs each configured to carry differential data signals, the plurality of remaining pairs cooperating to carry a second direct current voltage signal as a voltage differential concurrently with the first pair carrying the direct current voltage signal.

21. A method of delivering power and data in a telecommunications system, the method comprising:
receiving a power signal at a power connector of a first telecommunications panel;
receiving a data signal at a data connector of the first telecommunications panel;
transmitting a combined power output and data signal from a multichannel twisted pair connector of the first telecommunications panel, the combined power output and data signal based on the received power signal and data signal;
receiving the combined power output and data signal at a multichannel twisted pair connector of a second telecommunications panel;
distributing the combined power output and data signal to a plurality of single channel twisted pair connectors, each of the plurality of single channel twisted pair connectors including a first pair configured to carry a direct current voltage signal as a voltage differential across the pair and a plurality of remaining pairs each configured to carry differential data signals, the plurality of remaining pairs cooperating to carry a second direct current voltage signal as a voltage differential concurrently with the first pair carrying the direct current voltage signal;

receiving at a telecommunications device, the combined power output and data signal, thereby powering the device and communicating data to the telecommunications device.

* * * * *